(12) United States Patent
Iyoda et al.

(10) Patent No.: US 7,933,515 B2
(45) Date of Patent: Apr. 26, 2011

(54) CAMERA BODY AND IMAGING DEVICE EQUIPPED WITH SAME

(75) Inventors: Makoto Iyoda, Osaka (JP); Atsushi Inoue, Tokushima (JP); Ryuichi Nagaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/555,059

(22) Filed: Sep. 8, 2009

(65) Prior Publication Data

US 2010/0061716 A1    Mar. 11, 2010

(30) Foreign Application Priority Data

Sep. 11, 2008   (JP) .................................. 2008-233191

(51) Int. Cl.
*G03B 17/00*   (2006.01)
*G03B 17/02*   (2006.01)
(52) U.S. Cl. ......................................... 396/535; 396/529
(58) Field of Classification Search ................... 396/529, 396/535
See application file for complete search history.

(56) References Cited

U.S. PATENT DOCUMENTS

| 6,307,590 | B1 | 10/2001 | Yoshida |
| 2006/0056049 | A1 | 3/2006 | Tokiwa et al. |
| 2007/0047936 | A1 | 3/2007 | Hirota |
| 2007/0104480 | A1 | 5/2007 | Shiozaki et al. |
| 2007/0147830 | A1 | 6/2007 | Amatatsu |
| 2007/0280674 | A1 | 12/2007 | Tomatsu |
| 2008/0198556 | A1 | 8/2008 | Iwata et al. |
| 2008/0316344 | A1* | 12/2008 | Yamamiya .................... 348/294 |
| 2010/0061717 | A1* | 3/2010 | Iyoda et al. .................. 396/535 |

FOREIGN PATENT DOCUMENTS

JP    2007-127836 A    5/2007

* cited by examiner

*Primary Examiner* — Rodney E Fuller
(74) *Attorney, Agent, or Firm* — Panasonic Patent Center; Dhiren Odedra; Kerry Culpepper

(57) ABSTRACT

A camera body includes a body mount to which the lens unit can be mounted, a metal main frame supporting the body mount, an imaging element configured to convert an optical image of the subject into image data, an intermediate part disposed along a thermal conduction path formed between the main frame and the imaging element, and a metal heat radiating member connected to the intermediate part.

8 Claims, 11 Drawing Sheets

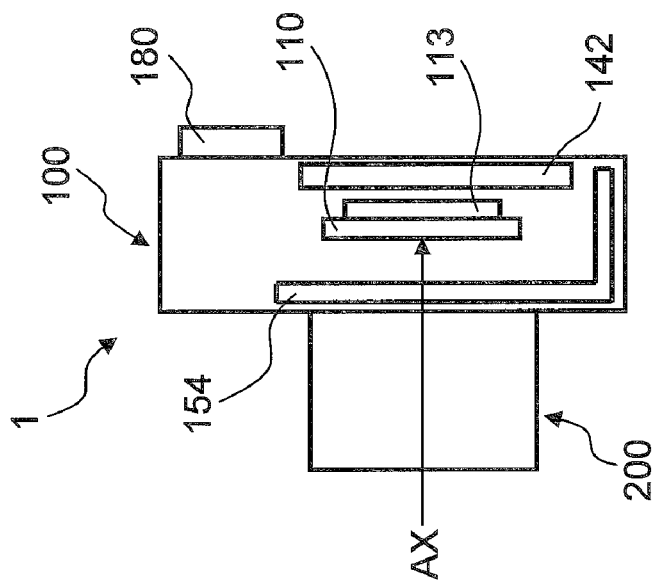
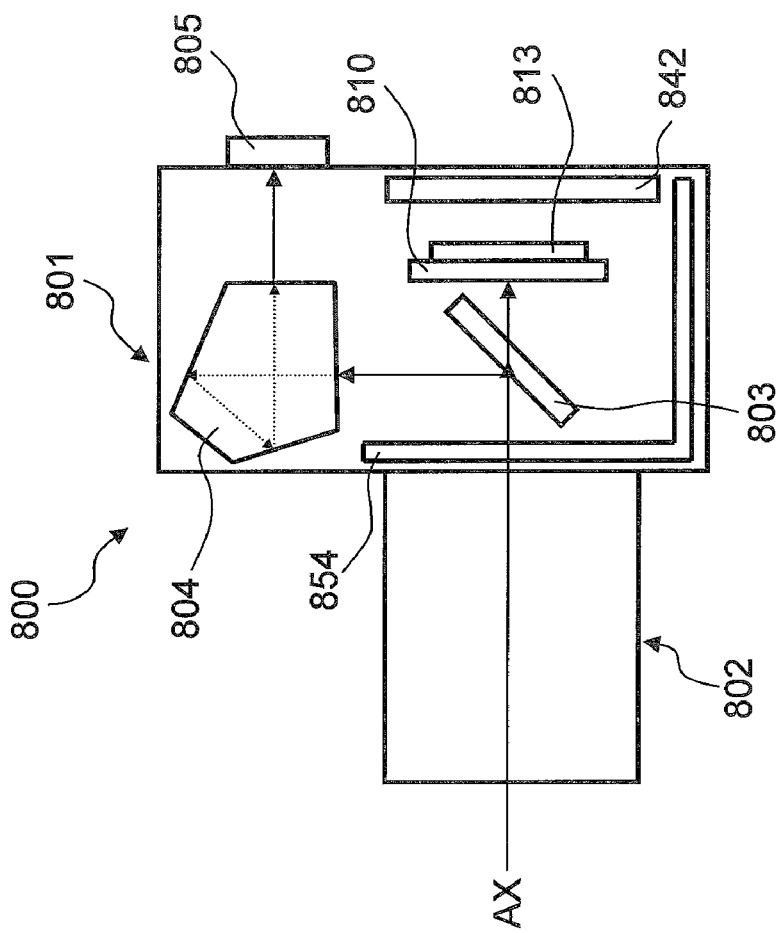
Fig. 6B
Fig. 6A

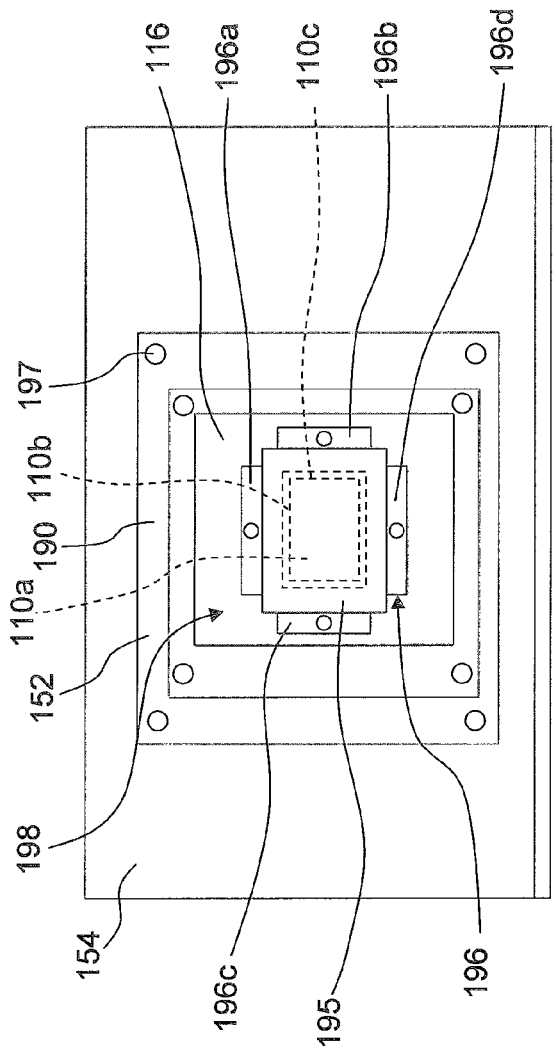
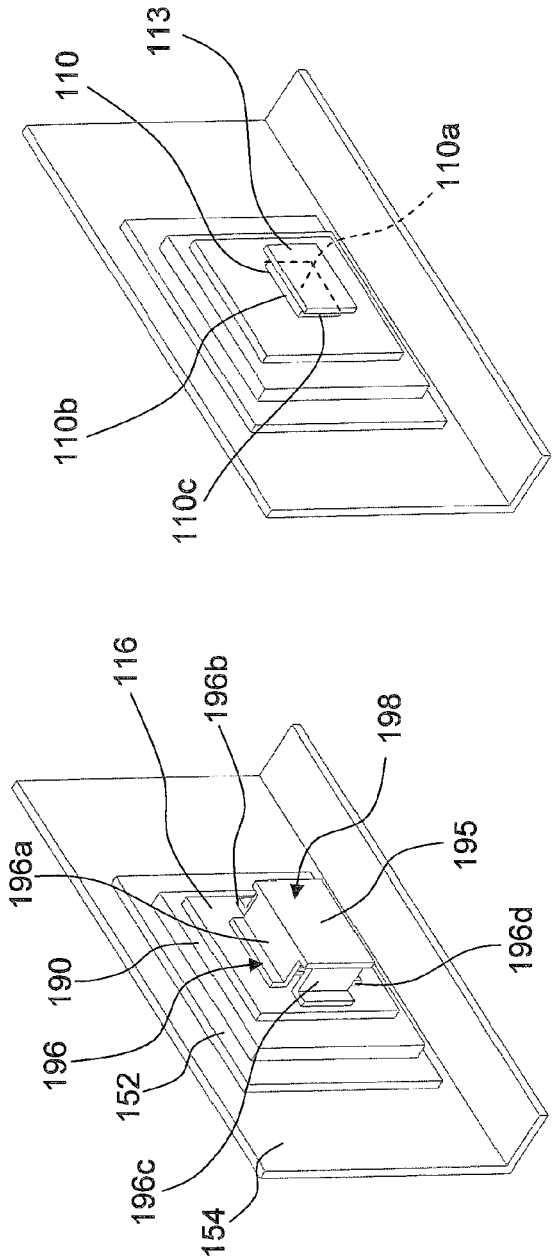
Fig. 7A
Fig. 7B
Fig. 7C

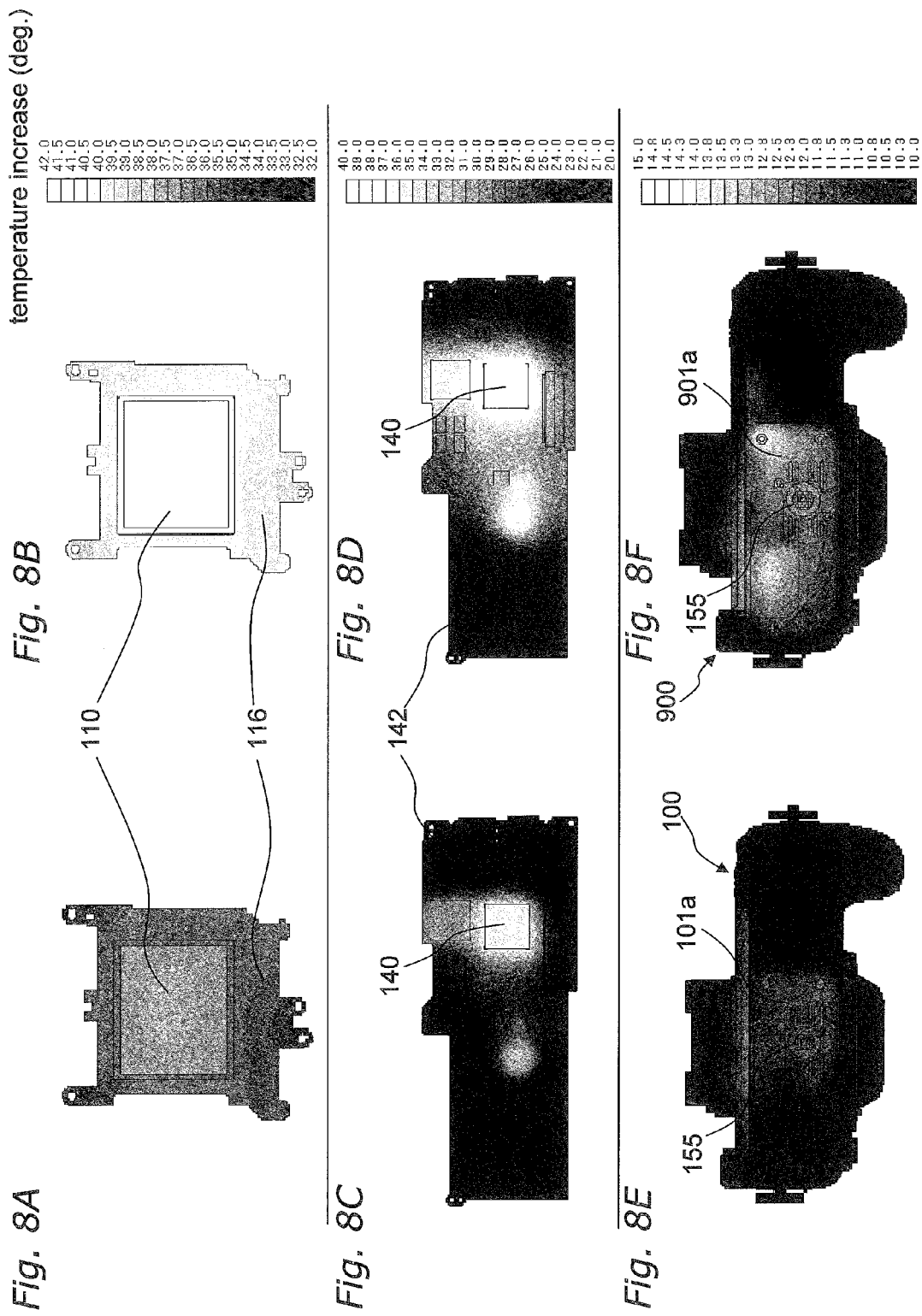

CAMERA BODY AND IMAGING DEVICE EQUIPPED WITH SAME

CROSS-REFERENCE TO RELATED APPLICATIONS

This application claims priority to Japanese Patent Application No. 2008-233191 filed on Sep. 11, 2008. The entire disclosure of Japanese Patent Applications No. 2008-233191 is hereby incorporated herein by reference.

BACKGROUND

1. Technical Field

The technical field relates to a camera body to which a lens unit can be mounted, and to an imaging device equipped with this camera body.

2. Description of the Related Art

Interchangeable lens digital cameras are an example of a known imaging device. The camera discussed in Japanese Laid-Open Patent Application 2007-127836, for example, includes a lens unit and a camera body. This camera body has an imaging element such as a CCD (charge coupled device) image sensor, and a mirror box device disposed between the lens unit and the imaging element. The mirror box device guides the light that has passed through the lens unit to either a CCD image sensor or a prism. The light guided to the prism is guided to a viewfinder.

SUMMARY

There has long been a need for smaller imaging devices, and with interchangeable lens digital cameras, there is a need to reduce the size of the camera body.

When the camera body is made smaller, however, this reduces the space surrounding the electronic parts, such as the imaging element or the main circuit board on which the camera controller is mounted, which means that these electronic parts are packed together more densely.

Meanwhile, as image quality rises, the imaging element and the camera controller consume a greater amount of electrical power, so these electrical parts generate more heat. As a result, the thermal density around the electronic parts rises, and there is the risk that the heat generated by the electronic parts will be conducted to the main frame and other such members, and that the temperature of the members supported by the main frame (such as the body mount) will rise. In this case, it is possible that the body mount may feel hot to the user's touch.

This increase in the temperature of the body mount can be suppressed with the camera body described below.

A camera body according to a first aspect is a device to which can be mounted a lens unit that forms an optical image of a subject, comprising a body mount to which the lens unit can be mounted, a metal main frame supporting the body mount, an imaging element configured to convert an optical image of the subject into image data, an intermediate part disposed along a thermal conduction path formed between the main frame and the imaging element, and a metal heat radiating member connected to the intermediate part.

With this camera body, heat generated by the imaging element is conducted through the intermediate part from the imaging element to the main frame. Since a metal heat radiating member is connected to the intermediate part here, part of the heat conducted to the intermediate part is radiated through the heat radiating member. As a result, there is a reduction in the amount of heat conducted from the imaging element to the main frame, and it is less likely that heat generated by the imaging element will be conducted to the main frame. Consequently, an increase in the temperature of the body mount supported by the main frame can be suppressed.

An imaging device according to a second aspect is an imaging device for acquiring an image of a subject, comprising a lens unit for forming an optical image of the subject, and the camera body according to the first aspect, to which the lens unit can be mounted.

In this case, since the imaging device comprises the camera body according to the first aspect, an increase in the temperature of the imaging device can be suppressed.

As discussed above, with the above-mentioned camera body and imaging device, an increase in the temperature of the body mount can be suppressed.

BRIEF DESCRIPTION OF THE DRAWINGS

Referring now to the attached drawings which form a part of this original disclosure:

FIG. 6A is a simplified cross section of a single lens reflex camera 800, and FIG. 6B is a simplified cross section of the digital camera 1;

FIGS. 7A to 7C are simplified diagrams illustrating a heat radiating structure;

FIGS. 8A to 8F are diagrams showing a comparison of the temperature distributions of different heat radiating structures;

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1-1: Overview of Digital Camera

Figure 1:
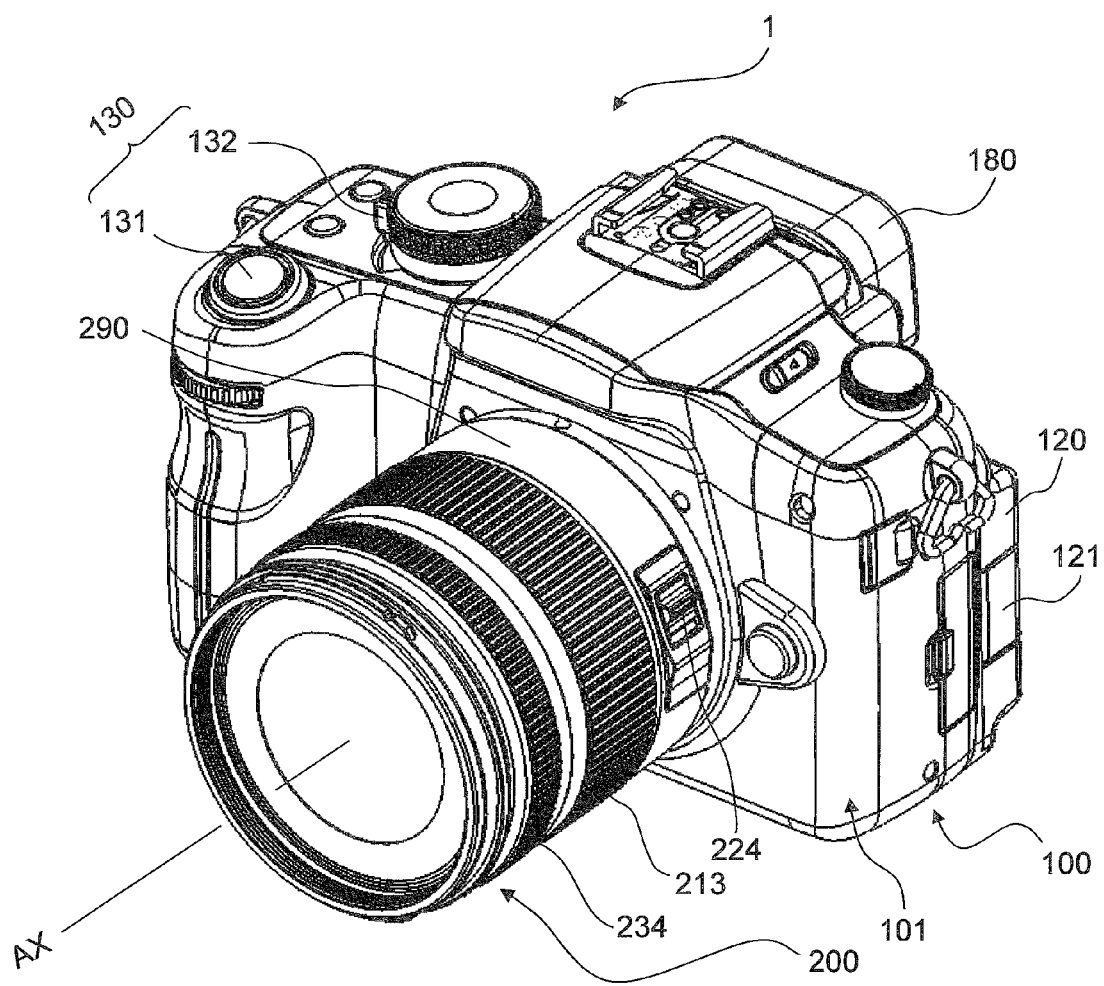
FIG. 1 is an oblique view of a digital camera 1.
Figure 2:
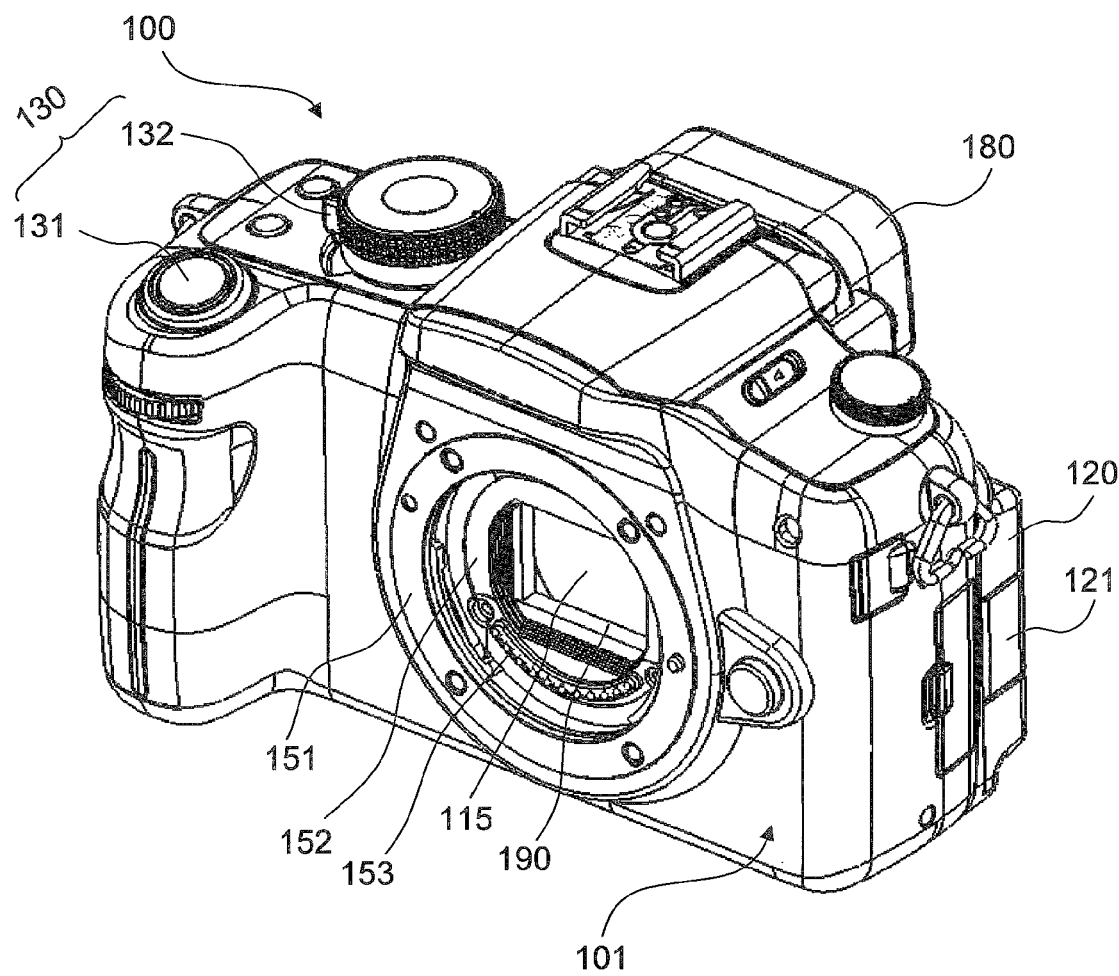
FIG. 2 is an oblique view of a camera body 100.
Figure 3:
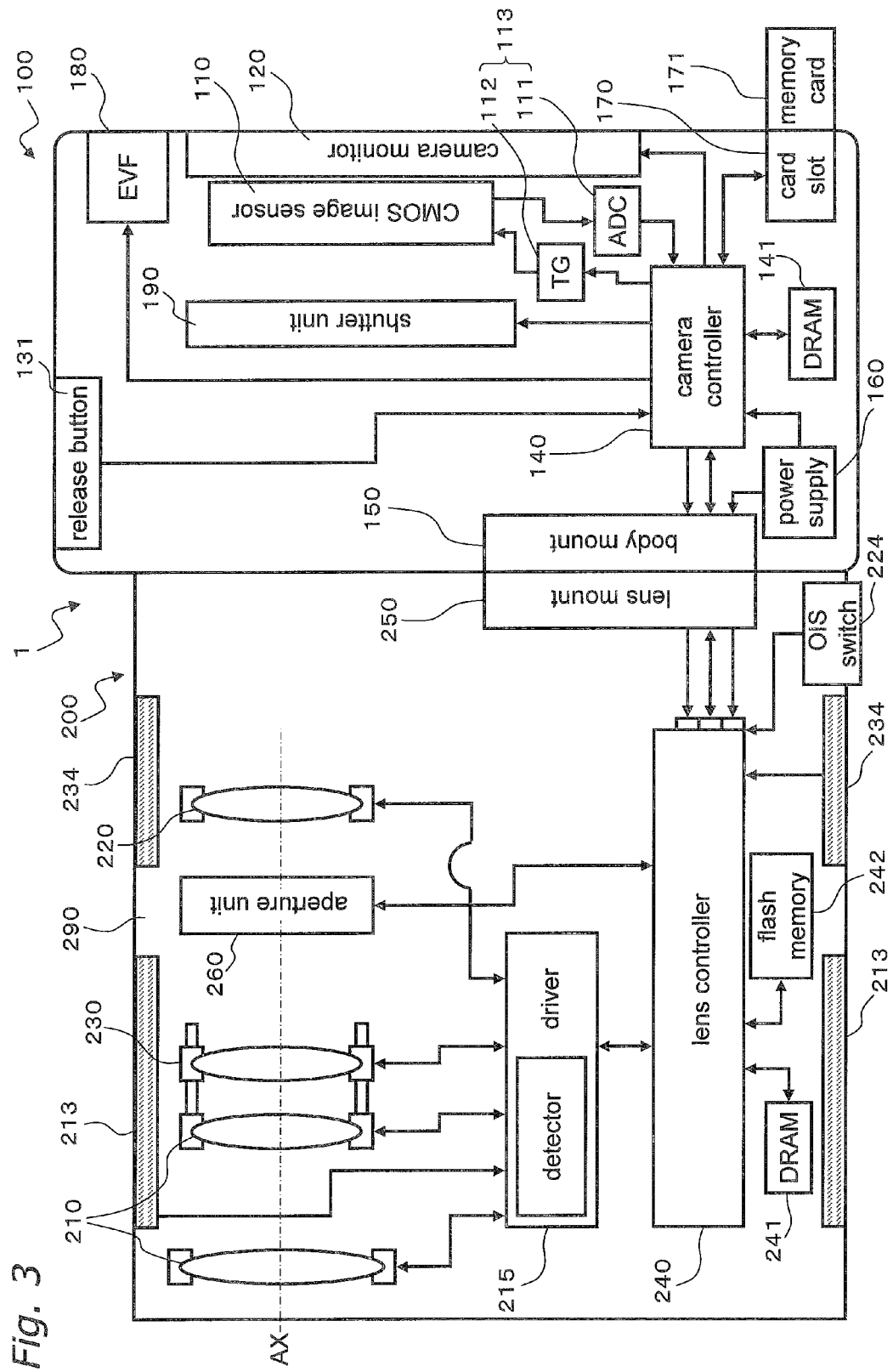
FIG. 3 is a block diagram of the digital camera 1.

FIG. 1 is an oblique view of a digital camera 1 according to a first embodiment. FIG. 2 is an oblique view of a camera body 100. FIG. 3 is a function block diagram of the digital camera 1.

The digital camera 1 is an interchangeable lens digital camera, and includes the camera body 100 and a lens unit 200 that can be mounted to the camera body 100.

Unlike a single lens reflex camera, the camera body 100 does not have a mirror box device, so the flange back is smaller than with a single lens reflex camera. Also, reducing the size of the flange back makes the camera body 100 smaller. Furthermore, reducing the size of the flange back affords greater latitude in the design of the optical system, so the lens unit 200 can be smaller. The various components will now be described in detail.

For the sake of this description, the subject side of the digital camera 1 will also be called the front, the vertical upper side will also be called the upper side or above, and the vertical lower side will also be called the lower side or below, when the digital camera 1 is in its usual orientation (hereinafter referred to as landscape orientation).

Figure 5:
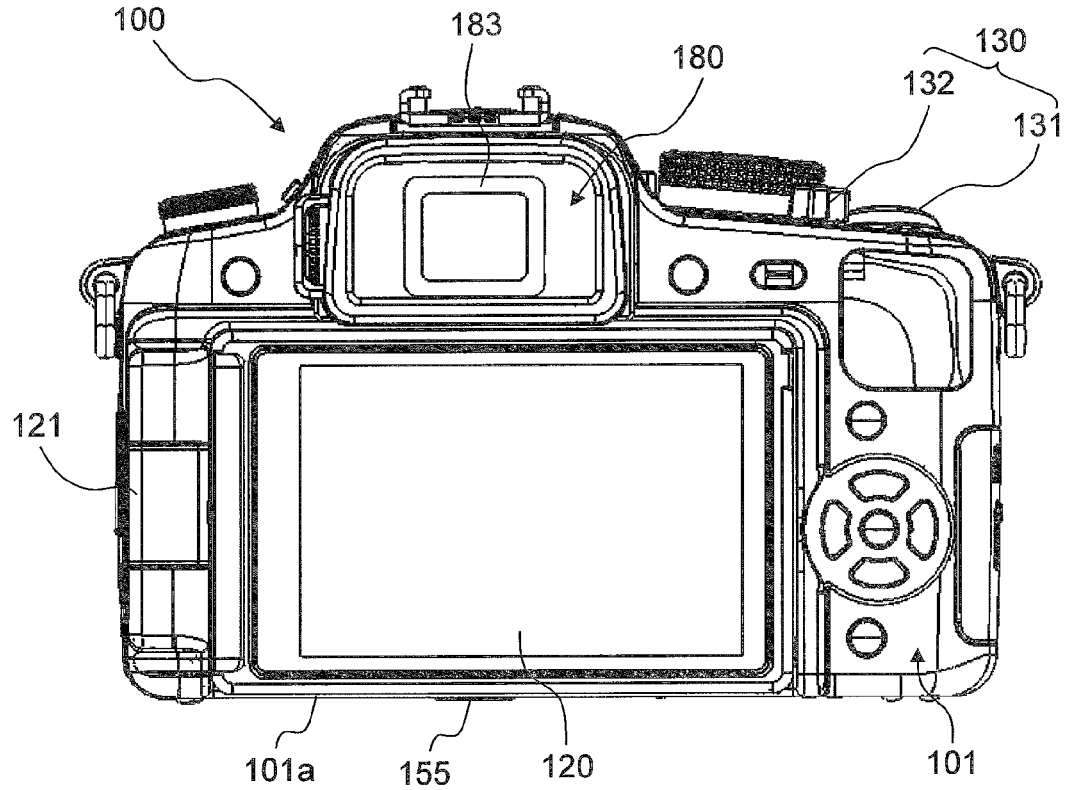
FIG. 5 is a rear view of the digital camera 1.

The landscape orientation referred to here is a state in which the bottom face 101a of the camera body 100 is on the vertical lower side of a CMOS image sensor 110 (discussed below), and the bottom face 101a is perpendicular to the vertical direction. In this embodiment, as shown in FIG. 5, of the faces that make up the housing 101 (discussed below) of the camera body 100, the face on which a tripod attachment unit 155 (discussed below) is provided is termed the bottom face 101a of the camera body 100.

1-2: Configuration of Camera Body

Figure 4:
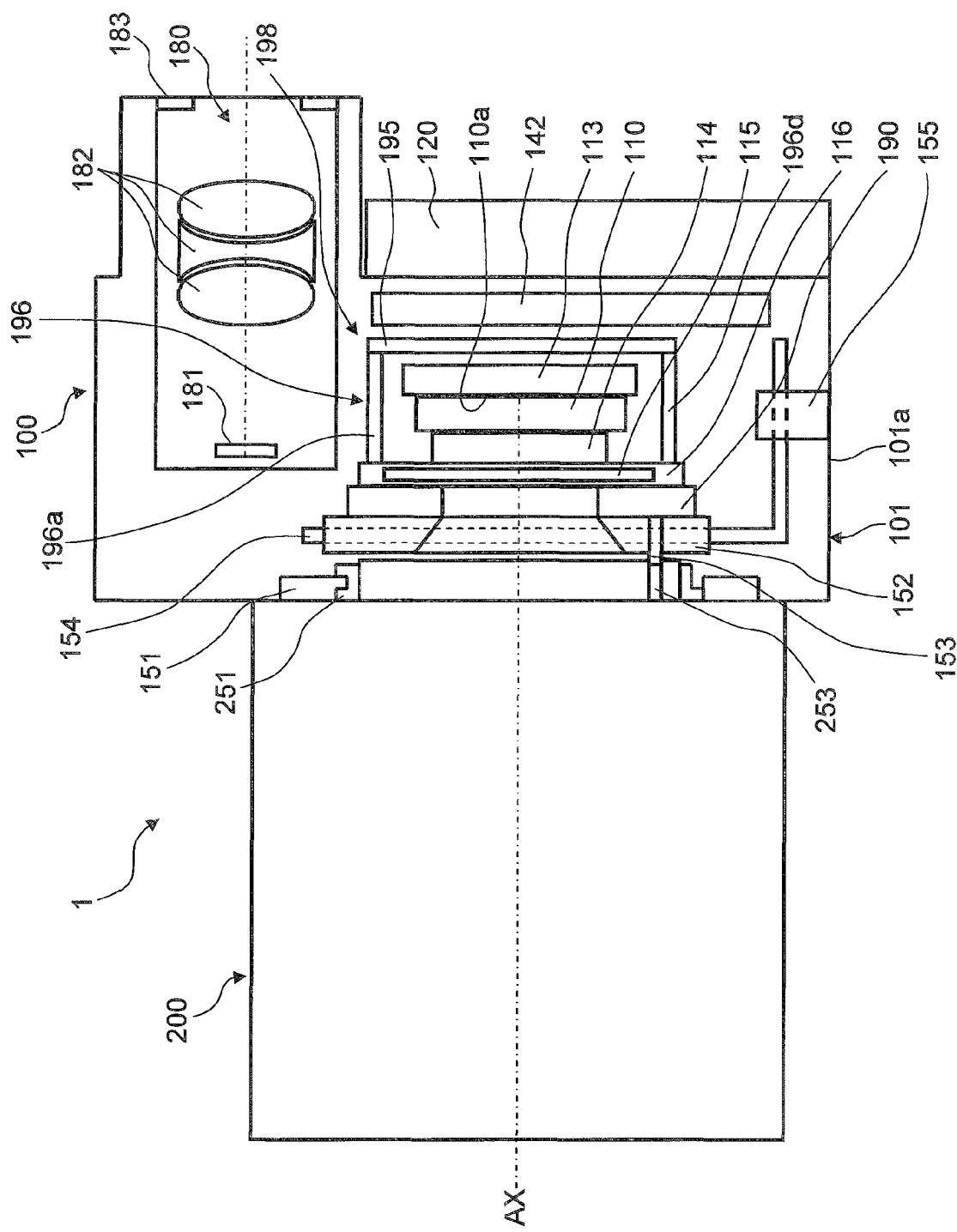
FIG. 4 is a simplified cross section of the digital camera 1.

FIG. 4 is a simplified cross section of the digital camera 1. FIG. 5 is a rear view of the digital camera 1. The camera body 100 mainly includes the CMOS (complementary metal oxide semiconductor) image sensor 110, a CMOS circuit board 113, a camera monitor 120, controls 130, a main circuit board 142 that includes a camera controller 140, a body mount 150, a power supply 160, a card slot 170, an electronic viewfinder 180, a shutter unit 190, an optical low-pass filter 114, a diaphragm 115, a main frame 154, the tripod attachment unit 155, a heat radiating member 198, and the housing 101.

The body mount 150, the shutter unit 190, the diaphragm 115, the optical low-pass filter 114, the CMOS image sensor 110, the CMOS circuit board 113, the heat radiating plate 195, the main circuit board 142, and the camera monitor 120 are disposed in that order, starting from the front, in the camera body 100. Also, the main frame 154 is disposed at a location that overlaps the body mount 150 in a direction parallel to the optical axis AX (hereinafter also referred to as the optical axis direction).

The CMOS image sensor 110 (an example of the imaging element) converts an optical image of a subject (hereinafter also referred to as a subject image) incident through the lens unit 200 into image data. The image data thus produced is digitized by an A/D converter 111 of the CMOS circuit board 113. The image data digitized by the A/D converter 111 is subjected to various image processing by the camera controller 140. The "various image processing" referred to here includes gamma correction processing, white balance correction processing, scratch correction processing, YC conversion processing, electronic zoom processing, and JPEG compression processing, for example.

As shown in FIG. 7C, the CMOS image sensor 110 has a light receiving face 110a that receives light passing through the lens unit 200. In this embodiment, the light receiving face 110a of the CMOS image sensor 110 is oblong in shape, and has a pair of long sides 110b and a pair of short sides 110c. In a state in which the light receiving face 110a is perpendicular to the horizontal direction and the long sides 110b are horizontal, the digital camera 1 is in its landscape orientation. On the other hand, in a state in which the light receiving face 110a is perpendicular to the horizontal direction and the short sides 110c are horizontal, the digital camera 1 is in its portrait orientation.

The CMOS image sensor 110 operates on the basis of a timing signal produced by a timing generator 112 of the CMOS circuit board 113. The CMOS image sensor 110 can acquire still image data and moving image data by controlling the CMOS circuit board 113. The acquired moving image data is also used for displaying through images. Still image data and moving image data are examples of image data.

The term "through image" here refers to those images, out of the moving image data, that are not recorded to a memory card 171. Through images are mainly moving images, and are displayed on the camera monitor 120 and the electronic viewfinder 180 (hereinafter also referred to as EVF) in order to determine the composition of moving or still images.

The CMOS image sensor 110 is able to acquire high-resolution moving images used for recording, and to acquire low-resolution moving images used as through images. An example of a high-resolution moving image is a moving image in HD size (high definition size: 1920×1080 pixels). The CMOS image sensor 110 is an example of an imaging element that converts an optical image of a subject into an electrical image signal. The concept of imaging element here encompasses CCD image sensors and other such opto-electric conversion elements in addition to the CMOS image sensor 110.

The CMOS circuit board 113 (an example of an imaging element circuit board) is a circuit board that controls the CMOS image sensor 110. The CMOS circuit board 113 is a circuit board that subjects the image data outputted from the CMOS image sensor 110 to specific processing, and includes the timing generator 112 and the A/D converter 111. The CMOS circuit board 113 is an example of an imaging element circuit board that controls the drive of the imaging element and subjects the image data outputted from the imaging element to specific processing such as A/D conversion.

The camera monitor 120 is a liquid crystal display, for example, and displays the image indicated by the display-use image data, for example. The display-use image data is produced by the camera controller 140. This display-use image data is, for example, image data that has undergone image processing, or data for displaying the photography conditions, control menus, and so forth of the digital camera 1. The camera monitor 120 is able to selectively display both still images and moving images.

The camera monitor 120 is provided to the camera body 100. In this embodiment, it is disposed on the rear face of the camera body 100, but the camera monitor 120 may be disposed anywhere on the camera body 100. The angle between the display screen of the camera monitor 120 and the camera body 100 is variable. More specifically, as shown in FIG. 5, the camera body 100 has a hinge 121 that links the camera monitor 120 rotatably with respect to the housing 101. The hinge 121 is disposed on the left end of the housing 101. In more specific terms, the hinge 121 has a first hinge and a second hinge. The camera monitor 120 is able to rotate around the first hinge to the left and right with respect to the housing 101, and is able to rotate around the second hinge up and down with respect to the housing 101.

The camera monitor 120 is an example of the display unit provided to the camera body 100. The display unit can also be an organic EL, an inorganic EL, a plasma display panel, or anything else that can display images. Also, the display unit need not be provided to the rear face of the camera body 100, may instead be on a side face, the upper face, or somewhere else.

The electronic viewfinder 180 displays the image indicated by the display-use image data produced by the camera controller 140, for example. The EVF 180 is able to selectively display both still images and moving images. The EVF 180 and the camera monitor 120 may both display the same content, or may display different content. These are controlled by the camera controller 140. The EVF 180 has an EVF-use liquid crystal monitor 181 that displays images and the like, an EVF-use optical system 182 that enlarges the display of the EVF-use liquid crystal monitor 181, and an eyepiece 183 to which the user positions an eye.

The EVF 180 is also an example of a display unit. It differs from the camera monitor 120 in that the user positions an eye to look through it. The difference in terms of structure is that whereas the EVF 180 has the eyepiece 183, the camera monitor 120 does not have the eyepiece 183.

The proper display brightness is ensured with the EVF-use liquid crystal monitor 181 by providing a back light (not shown) in the case of a transmissive liquid crystal, and providing a front light (not shown) in the case of a reflective liquid crystal. The EVF-use liquid crystal monitor 181 is an example of an EVF-use monitor. This EVF-use monitor can be an organic EL, an inorganic EL, a plasma display panel, or anything else that can display images. In the case of a self-emitting device such as an organic EL, there is no need for an illumination light source.

The controls 130 are operated by the user. More specifically, as shown in FIGS. 1 and 2, the controls 130 include a release button 131 that the user presses to release the shutter, and a power switch 132, which is a rotary dial switch provided to the upper face of the camera body 100. The power switch 132 turns off the power at the first rotation position, and turns on the power at the second rotation position. The controls 130 may be in the form of buttons, levers, dials, a touch panel, or anything else that the user can operate.

The camera controller 140 is a device serving as the functional center of the camera body 100, and controls the various components of the camera body 100. For instance, the camera controller 140 controls the shutter unit 190 so that it is kept open when the power from the power supply 160 is shut off The camera controller 140 also receives commands from the controls 130. The camera controller 140 sends signals for controlling the lens unit 200 through the body mount 150 and a lens mount 250 to a lens controller 240, and indirectly controls the various components of the lens unit 200. Specifically, the camera controller 140 controls the entire digital camera 1.

The camera controller 140 controls the CMOS circuit board 113. More specifically, the camera controller 140 sends a control signal to the CMOS circuit board 113, and the CMOS circuit board 113 controls the CMOS image sensor 110 on the basis of the received control signal. The camera controller 140 also acquires image data that is produced by the 110 and has undergone specific processing such as A/D conversion by the CMOS circuit board 113, and performs further processing. For example, The camera controller 140 produces display-use image data or recording-use image data from image data that has been processed by the CMOS circuit board 113.

The camera controller 140 also receives various signals from the lens controller 240 via the body mount 150 and the lens mount 250. The camera controller 140 uses a DRAM 141 as a working memory during control operations and image processing operations. The camera controller 140 is disposed on the main circuit board 142.

The card slot 170 allows the memory card 171 to be mounted. The card slot 170 controls the memory card 171 on the basis of a control signal sent from the camera controller 140. More specifically, the card slot 170 stores image data in the memory card 171. The card slot 170 outputs image data from the memory card 171. The card slot 170 also stores moving image data in the memory card 171. The card slot 170 outputs moving image data from the memory card 171.

The memory card 171 can store image data produced by image processing by the camera controller 140. For example, the memory card 171 can store compressed JPEG image files, or uncompressed raw image files. The memory card 171 also can output image data or image files stored ahead of time, via the card slot 170. The image data or image files outputted from the memory card 171 are subjected to image processing by the camera controller 140. For example, the camera controller 140 subjects the image data or image file acquired from the memory card 171 to expansion processing and produces display-use image data.

The memory card 171 is also able to store moving image data produced by image processing by the camera controller 140. For example, the memory card 171 can store a moving image file compressed according to H.264/AVC, which is a moving image compression standard. The memory card 171 can also output, via the card slot 170, moving image data or moving image files stored ahead of time. The moving image data or moving image files outputted from the memory card 171 are subjected to image processing by the camera controller 140. For example, the camera controller 140 subjects the moving image data or moving image file acquired from the memory card 171 to expansion processing and produces display-use moving image data.

The memory card 171 is also an example of a memory unit. The memory unit may be one that can be mounted to the camera body 100, such as the memory card 171, or may be one that is fixed to the digital camera 1.

The power supply 160 supplies the various components with electrical power for use by the digital camera 1. The power supply 160 may, for example, be a dry cell, or may be a rechargeable cell. The power supply 160 also may be a unit that receives a supply of power from an external power supply via a power cord or the like, and supplies this power to the digital camera 1.

The body mount 150 has a body mount ring 151 and an electrical contact 153. The body mount ring 151 mechanically supports the lens unit 200 by mating with a lens mount ring 251. More specifically, the lens mount ring 251 can be inserted in the body mount ring 151, and once inserted in the body mount ring 151, the lens mount ring 251 is able to rotate with respect to the body mount ring 151.

The lens mount ring 251 is inserted into the body mount ring 151, and the lens mount ring 251 is then rotated with respect to the body mount ring 151 until the two mate. When the body mount ring 151 is mated with the lens mount ring 251, the body mount ring 151 mechanically supports the lens unit 200.

The body mount ring 151 needs a certain amount of strength to support the lens mount ring 251, so the body mount ring 151 is preferably formed from metal. In this embodiment, the body mount ring 151 is formed from metal.

The body mount 150 is supported on the main frame 154 via a body mount contact support 152 (an example of the intermediate part). The body mount contact support 152 is an example of the intermediate part disposed along the thermal conduction path from the CMOS image sensor 110 to the main frame 154. The body mount contact support 152 is connected to the body mount ring 151 and supports the body mount ring 151. The body mount contact support 152 is supported by the main frame 154 and is disposed between the body mount ring 151 and the shutter unit 190. Also, the body mount contact support 152 has an opening, and the inside diameter of this opening is smaller than the inside diameter of the body mount ring 151.

In a state in which the lens unit 200 has been mounted to the camera body 100, the electrical contact 153 is in contact with an electrical contact 253 had by the lens mount 250. Thus, the body mount 150 and the lens mount 250 can be electrically connected via the electrical contact 153 of the body mount 150 and the electrical contact 253 of the lens mount 250. Therefore, the camera body 100 sends and receives data and/or control signals to and from the lens unit 200 via the body mount 150 and the lens mount 250. More specifically, the body mount 150 and the lens mount 250 send and receive data and/or control signals to and from the lens controller 240 included in the lens unit 200 and the camera controller 140. Also, the body mount 150 supplies the power received from the power supply 160 to the entire lens unit 200 via the lens mount 250.

The shutter unit 190 (an example of an intermediate part) is what is known as a focal plane shutter. The shutter unit 190 is disposed between the body mount 150 and the CMOS image sensor 110. The shutter unit 190 has a rear curtain, a front curtain, and a shutter support frame. The shutter support frame has an opening. The front curtain and rear curtain move in and out of the opening, thereby guiding light through the opening to the CMOS image sensor 110, or blocking light to the CMOS image sensor 110. The shutter unit 190 is able to maintain an open state mechanically. This mechanical maintenance is a concept whereby an open state is maintained without the use of electrical force. For example, this mechanical maintenance may involve engaging two objects, or may involve supporting them with a permanent magnet.

The optical low-pass filter 114 removes the high-frequency component of the subject light. More specifically, the optical low-pass filter 114 separates a subject image formed by the lens unit 200 so that the resolution is coarser than the pitch of the pixels of the CMOS image sensor 110. In general, the CMOS image sensor 110 or other imaging element has an RGB color filter called a Bayer pattern, or a YCM complementary color filter, provided for each pixel. Therefore, if the resolution goes to one pixel, not only will a false color be generated, but if the subject is a repeating pattern, an unattractive moire will result. Furthermore, the optical low-pass filter 114 has an Ir cut filter function for cutting out infrared light.

The diaphragm 115 is disposed in front of the CMOS image sensor 110, is supported by a diaphragm support 116 (an example of an intermediate part), and prevents dust from clinging to the CMOS image sensor 110. Also, any dust clinging to the diaphragm 115 itself is knocked off by the vibration of the diaphragm 115. More specifically, the diaphragm 115 is configured such that a thin, transparent sheet-like member is fixed to yet another member constituting the diaphragm 115 via a piezoelectric element. AC voltage is applied to the piezoelectric element, which causes the piezoelectric element to vibrate, and this vibrates the sheet-like member. The diaphragm 115 is supported by the diaphragm support 116 so as to be disposed in a specific position with respect to the CMOS image sensor 110. The diaphragm support 116 is supported on the main frame 154 via the body mount 150 and the shutter unit 190.

The main frame 154 is disposed along the lower face from the front face inside the camera body. The main frame 154 is connected to the body mount contact support 152 of the body mount 150, and supports the lens unit 200 via the body mount 150. Accordingly, the main frame 154 needs to have a certain amount of strength. Therefore, the main frame 154 is preferably formed from a metal. In this embodiment, the main frame 154 is formed from metal.

The tripod attachment unit 155 has a threaded hole for attaching a tripod, and is connected to the main frame 154. The threaded hole is exposed on the lower face of the camera body 100. The tripod attachment unit 155 supports the camera body 100 in a state in which it is attached to a tripod, so the tripod attachment unit 155 needs to have a certain amount of strength. Therefore, in this embodiment the tripod attachment unit 155 is formed from metal.

The heat radiating member 198 promotes the radiation of heat generated by the CMOS image sensor 110, and has a heat radiating plate 195 and a thermal conductor 196. The heat radiating effect will be better if a metal such as aluminum or copper is used as the material of the heat radiating member 198.

As shown in FIGS. 7A and 7B, the heat radiating plate 195 is a rectangular plate and is disposed between the CMOS image sensor 110 and the main circuit board 142. More specifically, the heat radiating plate 195 is disposed between the CMOS circuit board 113 and the main circuit board 142. When viewed in the optical axis direction, the external size of the heat radiating plate 195 is larger than the CMOS image sensor 110 and the CMOS circuit board 113.

The thermal conductor 196 is formed integrally with the heat radiating plate 195, for example, and is disposed opposite the CMOS image sensor 110 by a gap in the direction along the light receiving face 110a. More specifically, as shown in FIGS. 7A and 7B, the thermal conductor 196 has a first plate 196a, a second plate 196b, a third plate 196c, and a fourth plate 196d.

The first plate 196a is disposed on the upper side of the CMOS image sensor 110 by a gap (see FIG. 4). The second plate 196b is disposed to the side of the CMOS image sensor 110 (the left side when viewed from the front) by a gap. The third plate 196c is disposed to the side of the CMOS image sensor 110 (the right side when viewed from the front) by a gap. The fourth plate 196d is disposed on the lower side of the CMOS image sensor 110 by a gap (see FIG. 4).

The first to fourth plates 196a to 196d link the heat radiating plate 195 to the diaphragm support 116. More specifically, as shown in FIG. 4, the first to fourth plates 196a to 196d are fixed to the diaphragm support 116 and extend from the diaphragm support 116 to the opposite side from the body mount 150. Furthermore, the first to fourth plates 196a to 196d extend from the heat radiating plate 195 to the opposite side from the main circuit board 142.

As shown in FIGS. 7A and 7B, gaps are maintained between the first to fourth plates 196a to 196d, and the spaces inside and outside the heat radiating member 198 are linked via these gaps.

The housing 101 is a member that forms the outer face of the camera body 100, and houses in its interior the constituent parts of the camera body 100, such as the CMOS image sensor 110 and the main circuit board 142. The release button 131 and other such parts are disposed on the surface of the housing 101, and the main frame 154 is fixed on the inside of the housing 101. The body mount 150 is also fixed to the housing 101.

1-3: Configuration of Lens Unit

The lens unit 200 can be mounted to the camera body 100, and forms an optical image of a subject. More specifically, the lens unit 200 has an optical system L, a driver 215, the lens mount 250, an aperture unit 260, the lens controller 240, and a lens barrel 290.

The optical system L has a zoom lens group 210 for changing the focal length of the optical system L, an OIS (optical image stabilizer) lens group 220 for reducing blurring of the subject image formed by the optical system L with respect to the CMOS image sensor 110, and a focus lens group 230 for changing the focal state of the subject image formed on the CMOS image sensor 110 by the optical system L.

The aperture unit 260 is a light quantity adjusting member that adjusts the quantity of light transmitted by the optical system. More specifically, the aperture unit 260 has aperture vanes (not shown) that can block part of the light rays transmitted by the optical system L, and an aperture driver (not shown) that drives the aperture vanes.

The lens controller 240 controls the entire lens unit 200 on the basis of control signals sent from the camera controller 140. More specifically, the lens controller 240 sends and receives signals to and from the camera controller 140 via the lens mount 250 and the body mount 150. The lens controller 240 receives position information about the optical system L detected by a detector included in the driver 215, and sends this information to the camera controller 140. The camera controller 140 processes the received position information and sends a control signal to the lens controller 240. The lens controller 240 receives the control signal issued by the camera controller 140, and transmits the control signal to the driver 215. The driver 215 adjusts the position of the zoom lens 210, the OS lens 220, and the focus lens 230 on the basis of the control signal. Also, the camera controller 140 instructs the aperture unit 260 to operate on the basis of the amount of light received by the CMOS image sensor 110, whether moving image photography or still photography is being performed, whether or not an aperture value has been preferentially set with the controls, or other such information. At this point the lens controller 240 relays the instruction from the camera controller 140 to the aperture unit 260. The lens controller 240 also uses a DRAM 241 as a working memory during control. Also, a flash memory 242 stores programs and parameters used in control by the lens controller 240.

The lens barrel 290 mainly houses in its interior the optical system, the lens controller 240, the lens mount 250, and the aperture unit 260. A zoom ring 213, a focus ring 234, and an OIS switch 224 are provided on the outside of the lens barrel 290.

The zoom ring 213 is a cylindrical member that is able to rotate around the outer peripheral face of the lens barrel 290. The zoom ring 213 is an example of a control used to adjust the focal length.

The focus ring 234 is a cylindrical member that is able to rotate around the outer peripheral face of the lens barrel 290. The focus ring 234 is an example of a control used to adjust the focal state of a subject image formed on the CMOS image sensor 110 by the optical system.

The OIS switch 224 is an example of a control used to adjust the OIS. The OIS lens 220 does not operate when the OIS switch 224 is off The OIS lens 220 is able to operate when the OIS switch 224 is on.

1-4: Features of Structure

The camera body 100 does not have a mirror box device, and differs in this respect from a single lens reflex camera. The features of the structure of the camera body 100 will now be described in greater detail through reference to the drawings.

FIG. 6A is a simplified cross section of a single lens reflex camera, and FIG. 6B is a simplified cross section of the digital camera 1 of this embodiment. The body mount 150, the shutter unit 190, the diaphragm 115, the diaphragm support 116, the heat radiating plate 195, the thermal conductor 196, and other members are not shown in FIG. 6B.

With the single lens reflex camera 800 shown in FIG. 6A, a mirror box device is disposed on the front face of a CMOS image sensor 810, that is, on the lens unit 802 of the CMOS image sensor 810. The mirror box device includes a reflecting mirror 803 and a pentaprism 804. From front to back, a CMOS circuit board 813 and a main circuit board 842 that includes a camera controller 840 are disposed on the rear face of the CMOS image sensor 810 (that is, on the opposite side from the lens unit 802 with respect to the CMOS image sensor 110). Also, a metal main frame 854 is disposed along the front face and lower face in the interior of a camera body 801 to ensure the strength of the camera body 801.

With the single lens reflex camera 800, an optical image of a subject formed by the lens unit 802 is guided by the reflecting mirror 803 and the pentaprism 804 included in the mirror box device to the CMOS image sensor 810 or an optical viewfinder 805. Thus, space for disposing the movable reflecting mirror 803 and the pentaprism 804, and space for the optical path from the reflecting mirror 803 to the optical viewfinder 805 must be provided inside the camera body 801, which is not suited to making the camera body 801 smaller.

On the other hand, because there is much space inside the camera body 801, and the surface of the camera body 801 is large, or because it is easy to ensure enough distance between the CMOS image sensor 810 and the main circuit board 842, and other such reasons, with the single lens reflex camera 800 heat generated from the CMOS image sensor 810 is more easily dispersed, and heat generated from the CMOS image sensor 810 is less likely to be transferred to the main circuit board 842.

In contrast, as shown in FIG. 6B, with the digital camera 1 of this embodiment, since no mirror box device is disposed on the front side of the CMOS image sensor 110, the flange back can be shorter and the camera body 100 can be made smaller. Furthermore, because of the short flange back, there is greater latitude in designing the optical system L, and the lens unit 200 can be reduced in size. Therefore, eliminating the mirror box device allows the digital camera 1 to be made smaller.

Meanwhile, since there is no need for space to provide a mirror box device as with the single lens reflex camera 800, the camera body 100 can be made smaller, but because there is less space in which to house the CMOS image sensor 110, the main circuit board 142, and other such electronic parts, these electronic parts are mounted more closely together, and as a result, the heat generation density tends to be higher than with the single lens reflex camera 800.

Furthermore, higher image quality and the capture of moving images drive up the power consumption of the CMOS image sensor 110 and the camera controller 140, which results in more heat being generated by the CMOS image sensor 110 and the camera controller 140.

For instance, since the digital camera 1 makes use of the CMOS image sensor 110 that can capture high-resolution moving images, the power consumption is roughly three times higher than that with a CMOS image sensor that does not capture high-resolution moving images (such as the CMOS image sensor 810 of the single lens reflex camera 800) (an increase from 0.4 W to 1.2 W). As a result, the CMOS image sensor 110 generates more heat than a CMOS image sensor that does not capture high-resolution moving images.

As discussed above, with the digital camera 1, more heat is generated than with the single lens reflex camera 800, and the smaller size of the camera body 100 reduces volume, so the heat generation density within the camera body 100 is greater than with the camera body 801.

Therefore, in some cases the temperature of the CMOS image sensor 110 may rise, or heat from the CMOS image sensor 110 may raise the temperature of other electronic parts (such as the main circuit board 142), so there is the possibility that the electronic parts of the camera body 100 will be damaged.

Also, as size is reduced, the heat generated by the CMOS image sensor 110 is more readily transferred to the main frame 154, so heat is also readily transferred through the main frame 154 to the body mount 150 and the housing 101. As a result, it is possible that the camera body 100 may feel hot to the user's touch.

1-5: Heat Radiating Structure

As described above, with the digital camera 1, which has higher performance and a smaller size, heat generated by the CMOS image sensor 110 must be efficiently dispersed.

In view of this, as mentioned above, the heat radiating member 198 is provided with the camera body 100. More specifically, as shown in FIG. 4, the metal heat radiating plate 195 is disposed between the CMOS image sensor 110 and the main circuit board 142 (more precisely, between the main circuit board 142 and the CMOS circuit board 113 on the rear face of the CMOS image sensor 110). Any heat transferred from the CMOS image sensor 110 to the main circuit board 142 is absorbed by the heat radiating plate 195, so less of the heat from the CMOS image sensor 110 can be transferred to the main circuit board 142.

Also, since the thermal conductor 196 extends from the heat radiating plate 195 on the opposite side from the main circuit board 142, heat transferred to the heat radiating plate 195 is released to the surroundings via the thermal conductor 196 (the first to fourth plates 196a to 196d). As a result, the heat radiating efficiency of the heat radiating member 198 is higher, and an increase in the temperature of the CMOS image sensor 110 can be suppressed.

Figure 11:
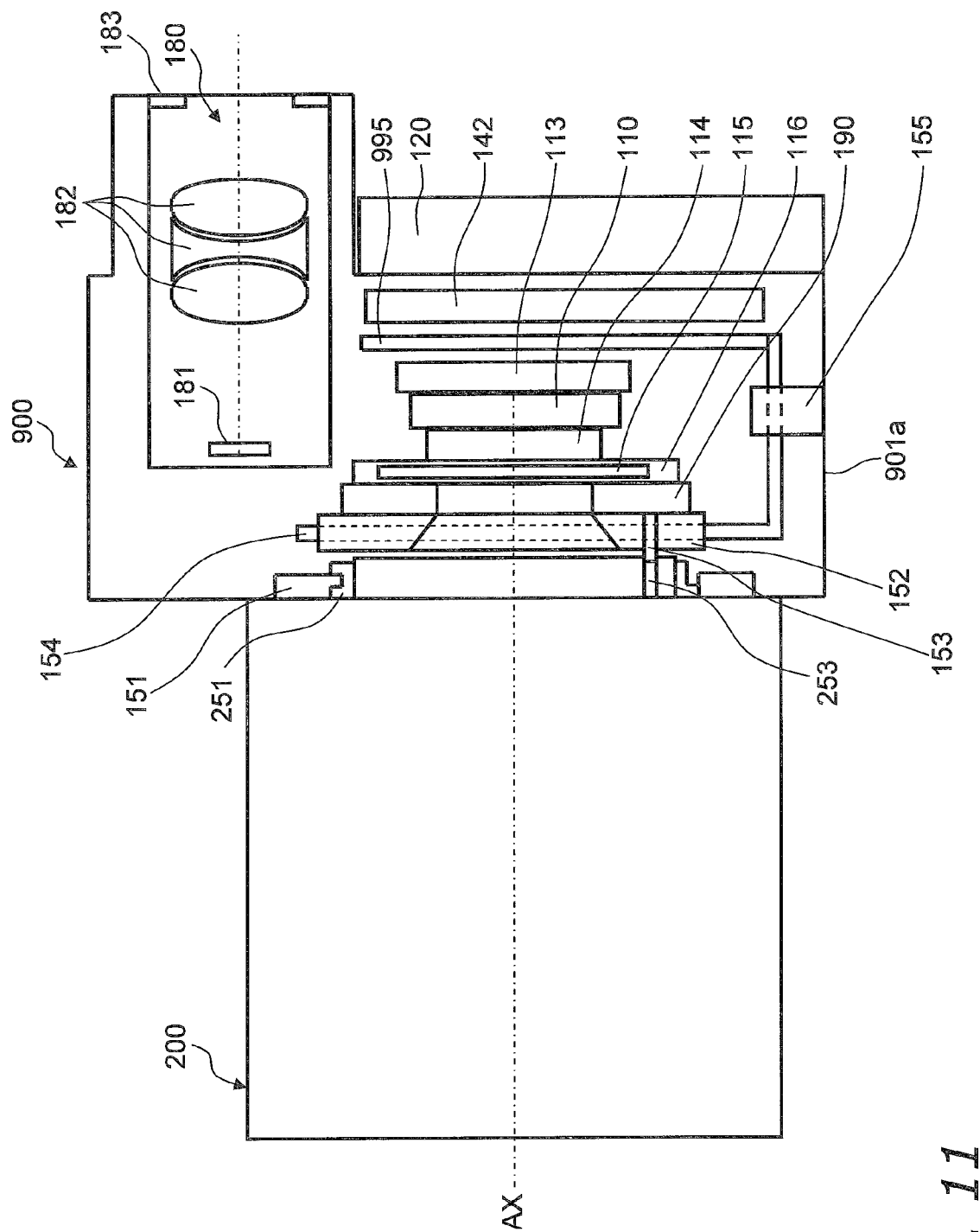
FIG. 11 is a simplified cross section of a digital camera in a reference example.

With a camera body 900 of the reference example shown in FIG. 11, unlike in this embodiment, a heat radiating plate 995 that corresponds to the heat radiating plate 195 is connected to the main frame 154, and the thermal conductor 196 is provided on the upper side, lower side, and both lateral sides of the CMOS image sensor 110.

However, again with this camera body 900, since heat transferred from the CMOS image sensor 110 to the main circuit board 142 is absorbed by the heat radiating plate 995, at least an increase in the temperature of the main circuit board 142 can be suppressed.

Meanwhile, with the camera body 900 shown in FIG. 11, since metal is used to ensure adequate strength of the main frame 154 and the tripod attachment unit 155, the thermal conductivity is higher than with a plastic, and heat is conducted from the heat radiating plate 995 through the main frame 154 to the tripod attachment unit 155. The temperature around the tripod attachment unit 155 on the bottom face 101a of the camera body 100 and the tripod attachment unit 155 then rises. Furthermore, since the main frame 154 is connected to the body mount 150, if heat generated by the CMOS image sensor 110 is transferred to the main frame 154, the temperature of the body mount 150 will rise. It is possible that the bottom face 101a of the camera body 100 or the tripod attachment unit 155 will feel hot if touched by the user, as will the body mount 150 (and particularly the body mount ring 151) during mounting or removal of the lens unit 200.

With this embodiment, however, since heat generated by the CMOS image sensor 110 tends not to be transferred by the heat radiating member 198 to the main frame 154, the body mount 150, the tripod attachment unit 155, and other such members will not feel hot if touched by the user, nor will the body mount 150 during mounting or removal of the lens unit 200.

More specifically, the optical low-pass filter 114, the diaphragm support 116, the shutter unit 190, and the body mount contact support 152 are disposed as intermediate parts between the CMOS image sensor 110 and the main frame 154, and these intermediate parts are fixed to each other. Accordingly, a thermal conduction path is formed between the CMOS image sensor 110 and the main frame 154, and any heat generated by the CMOS image sensor 110 will be transferred through this thermal conduction path to the main frame 154.

However, since the heat radiating member 198 is connected to the diaphragm support 116 disposed along the thermal conduction path, part of the heat transferred from the CMOS image sensor 110 to the main frame 154 is released to the surroundings via the diaphragm support 116 and the heat radiating member 198 (and more precisely, the thermal conductor 196). As a result, the amount of heat transferred from the CMOS image sensor 110 to the main frame 154 can be reduced, and an increase in the temperature of the body mount 150, the housing 101, and other such members can be suppressed.

Also, since the thermal conductor 196 extends from the diaphragm support 116 to the opposite side from the body mount 150, any heat transferred form the diaphragm support 116 to the thermal conductor 196 is released farther away from the body mount 150. Therefore, heat released from the diaphragm support 116 through the heat radiating member 198 is hindered from being transferred to the main frame 154 and the body mount 150 by convection, for example, and this further suppresses an increase in the temperature of the main frame 154 and the body mount 150.

Also, it is preferable for the diaphragm support 116 to be made from a metal with relatively high thermal conductivity, such as aluminum or copper. If the diaphragm support 116 is made of metal, then it can function as part of the heat radiating member 198, so the heat radiating efficiency of the heat radiating member 198 can be improved.

Further, a plastic or other such material with low thermal conductivity is used for the body mount contact support 152. Consequently, heat is less likely to be transferred from the diaphragm support 116, through the shutter unit 190 and the body mount contact support 152, to the metal main frame 154 and the metal body mount ring 151. An increase in the temperature of the tripod attachment unit 155 and the body mount ring 151 can also be suppressed. The tripod attachment unit 155 and the body mount ring 151 are made of metal, but since a high-temperature metal feels hotter to the touch than a plastic, it is particularly effective to use a material with low thermal conductivity for the body mount contact support 152.

Also, since it is possible that the temperature of the main frame 154 will be higher than that of the body mount ring 151 or the tripod attachment unit 155, the main frame 154 is not exposed even when the lens unit 200 has been removed, and cannot be touched from the outside of the camera body 100. More specifically, the main frame 154 is covered by the body mount contact support 152, the housing 101, and the diaphragm 115. Specifically, the main frame 154 is housed in the space formed by the body mount contact support 152, the housing 101, and the diaphragm 115. This prevents the main frame 154 from feeling hot to the user's touch.

1-6: Example of Simulation Results

FIGS. 8A to 8F show the results of calculating, by thermal simulation, the temperature distribution of the camera body 900 in the reference example shown in FIG. 11 and the camera body 100 of the above embodiment.

FIG. 8A shows the temperature distribution of the CMOS image sensor 110 of the camera body 100 in the first embodiment. FIG. 8b shows the temperature distribution of the CMOS image sensor 110 of the camera body 900 in the reference example. FIG. 8c shows the temperature distribution of the main circuit board 142 of the camera body 100 in the first embodiment. FIG. 8D shows the temperature distribution of the main circuit board 142 of the camera body 900 in the reference example. FIG. 8E shows the temperature distribution of the bottom face 101a of the camera body 100 in the first embodiment. FIG. 8F shows the temperature distribution of the bottom face 901a of the camera body 900 in the reference example. In FIGS. 8A to 8F, temperature distribution is indicated by the darkness of the shading, with white portions indicating a region of high temperature, and black portions a region of low temperature.

As shown in FIGS. 8A to 8F, a comparison of the heat radiating structure in this embodiment with the heat radiating structure in the reference example reveals that the temperature of the CMOS image sensor 110 and the main circuit board 142 is lower in this embodiment. The reason for this seems to be that the heat of the CMOS image sensor 110 is efficiently absorbed by the heat radiating plate 195 and the thermal conductor 196, and that heat is efficiently released from the CMOS image sensor 110 via the thermal conductor 196 extending to the front side.

It can also be seen that the temperature of the bottom face 101a of the camera body 100 is lower in this embodiment. The likely reason is that part of the heat transferred from the CMOS image sensor 110 to the main frame 154 is radiated to the outside of the thermal conduction path by the heat radiating member 198.

These results tell us that the heat radiating structure of this embodiment is effective at suppressing an increase in the temperature of the main circuit board 142, and suppressing an increase in the temperature of the bottom face 101a of the camera body 100.

1-7: Features of First Embodiment

The features of the digital camera 1 described above will now be compiled.

(1) With this camera body 100, since the heat radiating plate 195 of the heat radiating member 198 is disposed between the CMOS image sensor 110 and the main circuit board 142, the amount of heat transferred from the CMOS image sensor 110 to the main circuit board 142 can be reduced by the heat radiating plate 195. This suppresses an increase in the temperature of the main circuit board 142, and prevents the main circuit board 142 from being damaged by heat.

Also, since the thermal conductor 196 connected to the heat radiating plate 195 extends to the opposite side from the main circuit board 142, heat absorbed by the heat radiating plate 195 is released far away from the main circuit board 142 via the thermal conductor 196. Therefore, heat released from the heat radiating plate 195 via the thermal conductor 196 is hindered from being transferred to the main circuit board 142 by convection, for example, and this further suppresses an increase in the temperature of the main circuit board 142.

Furthermore, since the thermal conductor 196 is connected to the diaphragm support 116 disposed on the opposite side of the CMOS image sensor 110 from the main circuit board 142, if the temperature of the diaphragm support 116 is low, heat absorbed by the heat radiating plate 195 can be transferred to the diaphragm support 116, and this suppresses the convection of heat to the surroundings of the heat radiating plate 195.

(2) Heat generated by the CMOS image sensor 110 is transferred through the diaphragm support 116 to the main frame 154, but since the metal heat radiating member 198 is connected to the diaphragm support 116 here, part of the heat transferred to the diaphragm support 116 is radiated through the heat radiating member 198. As a result, the amount of heat transferred from the CMOS image sensor 110 to the main frame is reduced, and this suppresses an increase in the temperature of the main frame 154. That is, the increase in the temperature of the body mount 150 (or the tripod attachment unit 155) can be reduced.

Also, since the thermal conductor 196 of the heat radiating member 198 extends from the diaphragm support 116 to the opposite side from the body mount 150, heat transferred from the diaphragm support 116 to the heat radiating member 198 is released far away from the body mount 150. Therefore, heat released from the diaphragm support 116 via the heat radiating member 198 is hindered from being transferred to the body mount 150 by convection, for example, and this further suppresses an increase in the temperature of the body mount 150.

(3) Since the thermal conductor 196 is disposed so as to be opposite the gap with the CMOS image sensor 110 in a direction along the light receiving face 110a, the heat transferred to the diaphragm support 116 is released through the thermal conductor 196 into a relatively large space around the CMOS image sensor 110. Since the heat surrounding the CMOS image sensor 110 thus can be efficiently radiated via the heat radiating member 198, an increase in the temperature of the CMOS image sensor 110 can be suppressed.

(4) The air around the first plate 196a is warmed by the heat released from the first plate 196a, and this warmed air rises. In other words, the heat released from the first plate 196a readily spreads into the space above the first plate 196a by convection. Similarly, the heat released from the second plate 196b and the third plate 196c readily spreads into the space above the second plate 196b and the third plate 196c.

With this camera body 100, when the digital camera 1 is in its landscape orientation, the first plate 196a is disposed above the imaging element, and the second plate 196b and the third plate 196c are disposed to the sides of the CMOS image sensor 110. Therefore, with this camera body 100, in landscape orientation, which is used relatively often, at least the heat released from the first plate 196a, the second plate 196b, and the third plate 196c does not readily transfer to the CMOS image sensor 110. This allows heat generated by the CMOS image sensor 110 to be efficiently radiated away.

(5) Since the body mount contact support 152, which is disposed along the thermal conduction path from the CMOS image sensor 110 to the main frame 154, is made of a material with lower thermal conductivity than the main frame 154, the body mount contact support 152 slows the transfer of heat from the CMOS image sensor 110 to the main frame 154. As a result, the amount of heat transferred to the main frame 154 is reduced, and an increase in the temperature of the main frame 154 and the body mount 150 can be suppressed.

Also, since the body mount contact support 152, which is made of a material with low thermal conductivity, is disposed closer to the main frame 154 on the thermal conduction path than the portion connected to the heat radiating member 198, the amount of heat transferred from the CMOS image sensor 110 to the main frame 154 is reduced by the body mount contact support 152, and the amount of heat transferred from the CMOS image sensor 110 to the heat radiating member 198 increases. Consequently, heat radiation by the heat radiating member 198 can be improved, and an increase in the temperature of the main frame 154 and the body mount 150 can be further suppressed.

(6) The main frame 154 is housed inside the space formed by the body mount 150 and the housing 101. More precisely, the main frame 154 is housed in the space formed by the body mount 150, the housing 101, and the diaphragm 115. Accordingly, the main frame 154, whose temperature can be relatively high, is not exposed on the outside, and the user will not directly touch the main frame 154.

Second Embodiment

In the first embodiment above, the heat radiating member 198 is connected to the diaphragm support 116, but the heat radiating member 198 may instead be connected to another member. Here, the description will focus on differences from the camera body 100 of the first embodiment, and portions that are shared will not be described again. Furthermore, members having substantially the same function as in the first embodiment will be numbered the same, and will not be described again in detail.

Figure 9:
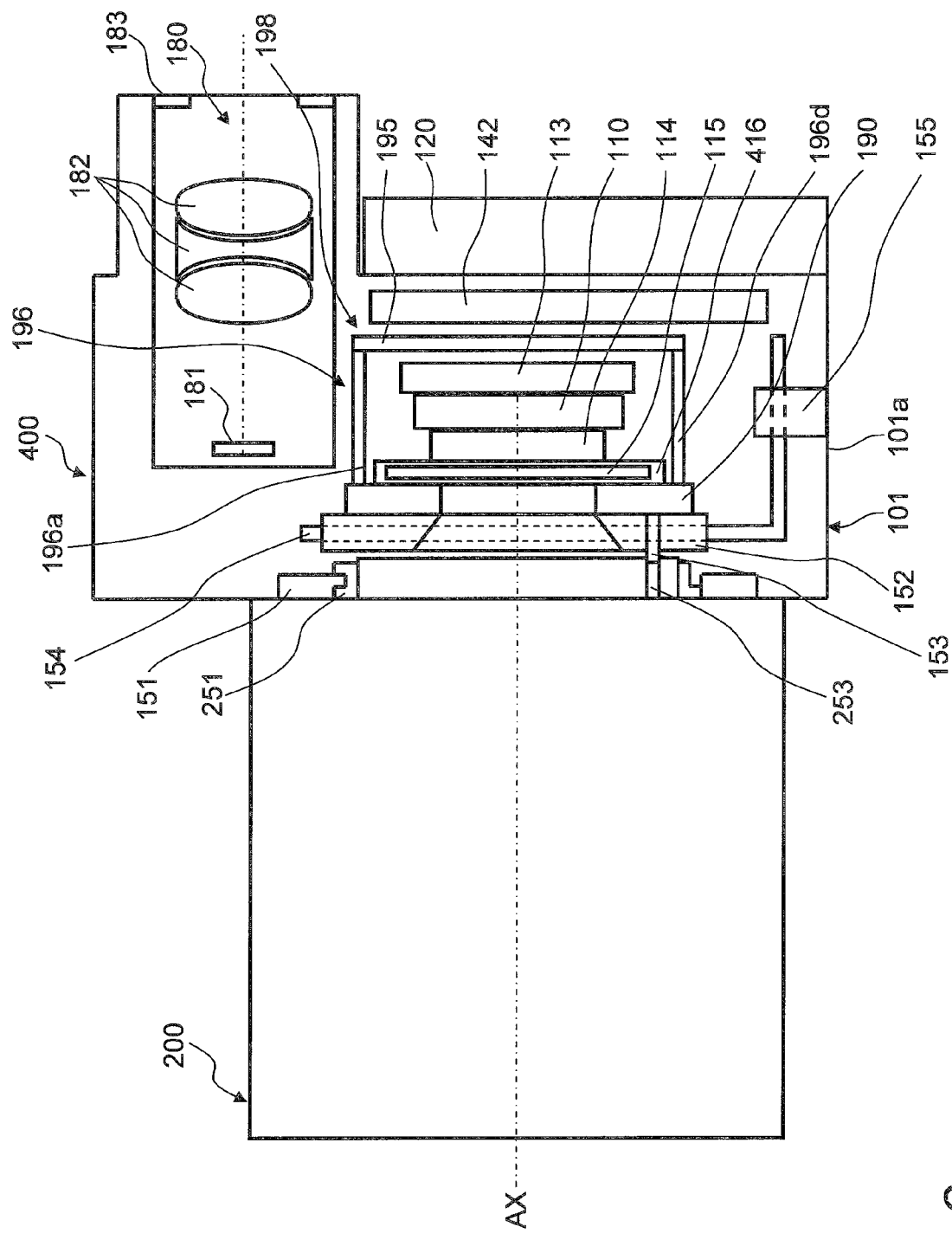
FIG. 9 is a simplified cross section of a camera body 400.

FIG. 9 is a simplified cross section of a camera body 400 according to the second embodiment. The camera body 400 differs from the camera body 100 in the first embodiment only in that the thermal conductor 196 of the heat radiating member 198 is connected not to the diaphragm support 116, but to the shutter unit 190, and the rest of the configuration is substantially the same as that of the camera body 100.

The thermal conductor 196 has a first plate 196a disposed above the CMOS image sensor 110, a second plate 196b and a third plate 196c disposed to the sides of the CMOS image sensor 110, and a fourth plate 196d disposed below the CMOS image sensor 110.

Also, unlike in the first embodiment, a diaphragm support 416 is disposed within the heat radiating member 198, and is surrounded above, below, and on both sides by the thermal conductor 196. More precisely, the first to fourth plates 196a to 196d are disposed above, on both sides, and below the diaphragm support 416.

The heat radiating plate 195 is disposed between the CMOS image sensor 110 and the main circuit board 142, and the CMOS image sensor 110 is supported by the heat radiating member 198 in five directions, namely, above, below, on both sides, and behind, excluding on the subject side, that is, from the front.

Here again, since heat transferred from the CMOS image sensor 110 to the main circuit board 142 is absorbed by the heat radiating plate 195, an increase in the temperature of the main circuit board 142 can be suppressed.

Also, since the heat radiating member 198 is connected to the shutter unit 190, which is disposed on the thermal conduction path from the CMOS image sensor 110 to the main frame 154, part of the heat transferred from the CMOS image sensor 110 to the main frame 154 is released via the thermal conductor 196. Consequently, an increase in the temperature of the main frame 154 can be suppressed.

Third Embodiment

The embodiment described below is also conceivable. The description will focus on differences from the camera body 100 of the first embodiment, and portions that are shared will not be described again. Furthermore, members having substantially the same function as in the first embodiment will be numbered the same, and will not be described again in detail.

Figure 10:
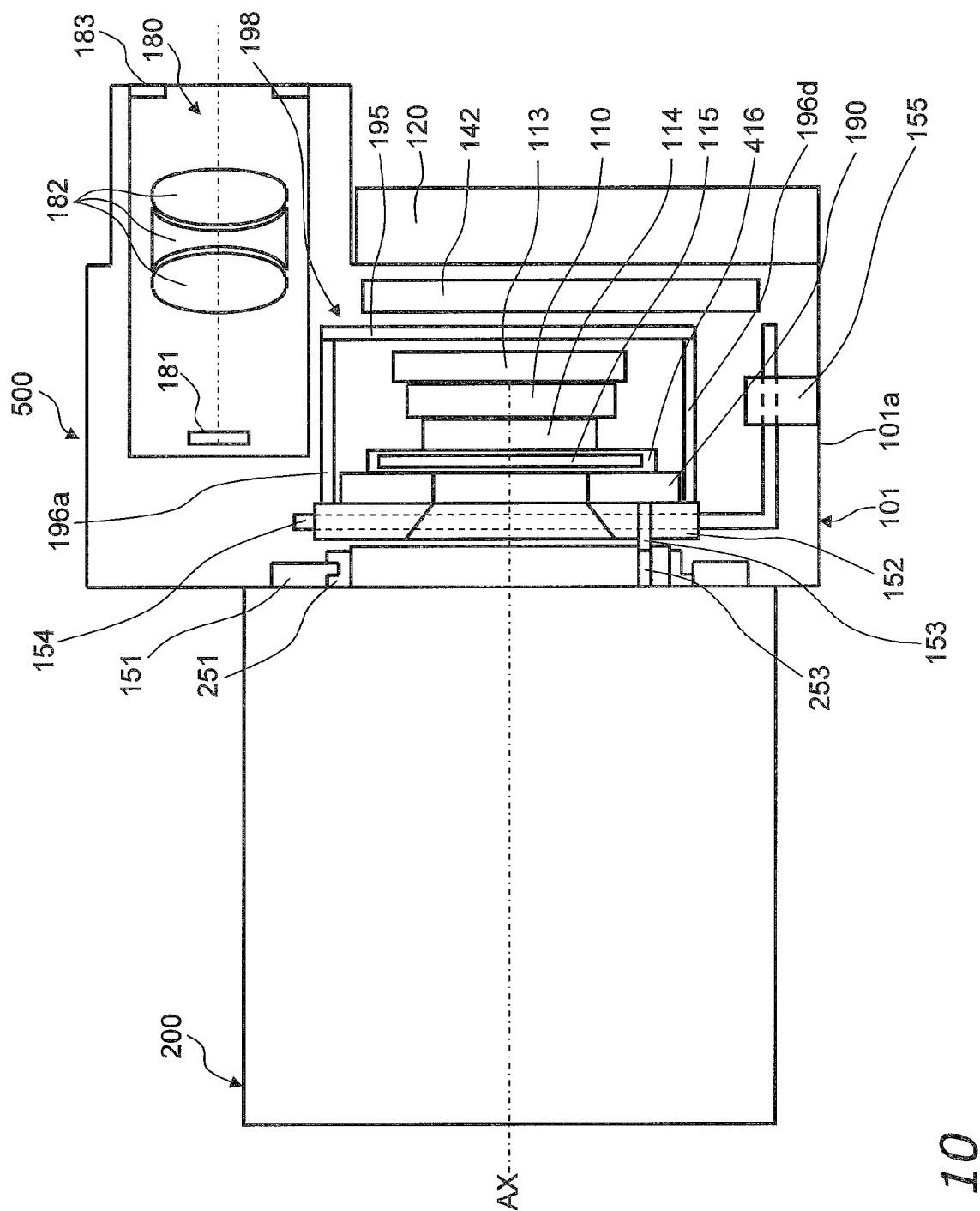
FIG. 10 is a simplified cross section of a camera body 500.

FIG. 10 is a simplified cross section of a camera body 500 according to the third embodiment. The camera body 500 differs from the camera body 100 in the first embodiment only in that the thermal conductor 196 of the heat radiating member 198 is connected not to the diaphragm support 116, but to the body mount contact support 152, and the rest of the configuration is substantially the same as that of the camera body 100.

The thermal conductor 196 has a first plate 196a disposed above the CMOS image sensor 110, a second plate 196b and a third plate 196c disposed to the sides of the CMOS image sensor 110, and a fourth plate 196d disposed below the CMOS image sensor 110.

Also, unlike in the first embodiment, a diaphragm support 416 and a shutter unit 190 are disposed within the heat radiating member 198, and are surrounded above, below, and on both sides by the thermal conductor 196. More precisely, the first to fourth plates 196a to 196d are disposed above, on both sides, and below the diaphragm support 416 and the shutter unit 190.

Also, the heat radiating plate 195 is disposed between the CMOS image sensor 110 and the main circuit board 142, and the CMOS image sensor 110 is surrounded by the heat radiating member 198 in five directions, namely, above, below, on both sides, and behind, excluding on the subject side, that is, from the front.

Here again, since heat transferred from the CMOS image sensor 110 to the main circuit board 142 is absorbed by the heat radiating plate 195, an increase in the temperature of the main circuit board 142 can be suppressed.

Also, since the heat radiating member 198 is connected to the body mount contact support 152, which is disposed on the thermal conduction path from the CMOS image sensor 110 to the main frame 154, part of the heat transferred from the CMOS image sensor 110 to the main frame 154 is released via the thermal conductor 196. Consequently, an increase in the temperature of the main frame 154 can be suppressed.

Other Embodiments

Embodiments of the present invention are not limited to those given above, and various modifications and alterations are possible without departing from the gist of the present invention.

(A)

In the first to third embodiments above, the heat radiating member 198 had the heat radiating plate 195, but if we only consider the effect of reducing the amount of heat transferred from the CMOS image sensor 110 to the main frame 154, the heat radiating member 198 need not have the heat radiating plate 195, and may have only the thermal conductor 196 instead.

Conversely, if we only consider the effect of reducing the increase in temperature of the main circuit board 142, the heat radiating member 198 need not have the thermal conductor 196, and may have only the heat radiating plate 195 instead. In this case, as shown in FIG. 11, the heat radiating plate 195 may have a configuration in which the heat radiating plate 195 is fixed to the main frame 154, for example.

Furthermore, the heat radiating plate 195 and the thermal conductor 196 are not limited to being integrally molded, and may instead be separate.

(B)

In the first to third embodiments above, the thermal conductor 196 had the first plate 196a, the second plate 196b, the third plate 196c, and the fourth plate 196d, but the thermal conductor 196 may have one or more of these, rather than all four.

Furthermore, in the first embodiment above, the first plate 196a, the second plate 196b, the third plate 196c, and the fourth plate 196d were all connected to the diaphragm support 116, but there is no need for all of the plates that make up the thermal conductor 196 to be connected to an intermediate part. For instance, one or some of the first to fourth plates 196a to 196d may be connected to the diaphragm support 116. Furthermore, one or some of the first to fourth plates 19 to 196d may be connected to the diaphragm support 116, and other plates connected to another part or other parts. The same applies to the second and third embodiments.

If we consider the support of the heat radiating plate 195, it is preferable for the heat radiating plate 195 to be fixed by three or more plates to a member on the body mount 150 side of the CMOS image sensor 110.

(C)

Also, the thermal conductor 196 is disposed above, below, and on both sides of the CMOS image sensor 110, but the heat radiating member 198 does not necessarily need to have all of the first plate 196a, the second plate 196b, the third plate 196c, and the fourth plate 196d, and one or more may be selected and connected to the diaphragm support 116, or the shutter unit 190, or the body mount contact support 152. For example, there may be (i) one plate consisting of the first plate 196a, (ii) two plates consisting of the second plate 196b and the third plate 196c, or (iii) three plates consisting of the first plate 196a, the second plate 196b, and the third plate 196c.

Convection by the air that surrounds the plates and has been warmed by the plates tends to spread into the space above the plates. Therefore, even if one of the above-mentioned (i), (ii), and (iii) is selected, heat released by the plates will tend not to spread into the CMOS image sensor 110 in landscape orientation, so heat around the CMOS image sensor 110 can be efficiently radiated.

In the case of (ii), in landscape orientation, the dispersal of heat into the space above by convection of air warmed by the CMOS image sensor 110 is not hindered by the first plate 196a, so this layout is thought to be afford better heat dispersal efficiency than (i) or (iii). However, to make it easier to position the heat radiating plate 195 inside the camera body 100, it is preferable to connect and fix three or more plates as in (iii).

(D)

The shutter unit 190 is provided in the first and third embodiments above, but the shutter unit 190 need not be provided, and the same shutter function as the shutter unit 190 may be realized by drive control of the CMOS image sensor 110. More specifically, the CMOS image sensor 110 successively resets the charge of each pixel from the line above. The charges of the pixels are read out successively from the line above so as to track the downward movement of the line resetting operation. Doing this allows each pixel to be exposed within the period of time from the point of resetting until the charge is read, and allows image data to be formed depending on the acquired charges.

(E)

In the first to third embodiments above, the camera monitor 120 and the EVF 180 are both provided, but the configuration may instead be such that only one of these is provided.

(F)

In addition to the CMOS image sensor 110, the imaging element may be a CCD image sensor.

(G)

In the above embodiments, the main circuit board 142 including the camera controller 140 is disposed on the outside of the heat radiating member 198. This is because the CMOS image sensor 110 consumes a relatively large amount of power, so it is the largest source of heat generation, and heat needs to be prevented from being transferred from the CMOS image sensor 110 to the main circuit board 142, on which many parts that are susceptible to the effects of heat (such as circuit parts) are mounted.

However, if parts that are susceptible to the effects of heat are mounted on the CMOS circuit board 113, the heat radiating plate 195 may be disposed between the CMOS image sensor 110 and the CMOS circuit board 113.

What is claimed is:

1. A camera body comprising:
a housing;
a body mount to which a lens unit configured to form an optical image of a subject is mountable, the body mount being fixed to the housing;
an imaging element disposed inside the housing and configured to convert the optical image of the subject into image data;
an imaging element circuit board electrically connected to the imaging element and configured to control the imaging element;
a main circuit board disposed inside the housing on an opposite side of the imaging element from the body mount with no mirror box device provided between the body mount and the imaging element, the main circuit including a camera controller;
a viewfinder including a monitor configured to display through images obtained based on an output of the imaging element;
a metal main frame disposed inside the housing and configured to support the body mount;
a thermal conduction path formed between the metal main frame and the imaging element;
an intermediate part disposed along the thermal conduction path; and
a metal heat radiating member connected to the intermediate part.

2. The camera body according to claim 1, wherein
the intermediate part includes a low-thermal conductivity member disposed along the thermal conduction path and having a lower thermal conductivity than the metal main frame.

3. The camera body according to claim 2, wherein
the low-thermal conductivity member is disposed along the thermal conduction path, closer to the metal main frame side than a portion to which the metal heat radiating member is connected.

4. The camera body according to claim 1, further comprising
a metal tripod attachment unit connected to the metal main frame.

5. The camera body according to claim 1, wherein
the intermediate part includes a diaphragm disposed between the body mount and the imaging element and configured to generate vibrations, and a diaphragm support supported by the metal main frame and supporting the diaphragm, and
the metal heat radiating member is connected to the diaphragm support.

6. The camera body according to claim 1, wherein
the intermediate part includes a shutter unit disposed between the body mount and the imaging element, and the metal heat radiating member is connected to the shutter unit.

7. The camera body according to claim 1, wherein
the intermediate part includes a body mount contact support fixed to the metal main frame and supporting the body mount with respect to the metal main frame, and
the heat radiating member is connected to the body mount contact support.

8. The camera body according to claim 7, wherein
the body mount contact support is disposed along the thermal conduction path and has a lower thermal conductivity than the metal main frame.

* * * * *